(12) United States Patent
Hönninger et al.

(10) Patent No.: US 6,341,814 B1
(45) Date of Patent: Jan. 29, 2002

(54) HEATING SYSTEM FOR AN OPEN MOTOR VEHICLE

(75) Inventors: Anton Hönninger, Lauda-Königshofen; Karl Kübler, Freiberg; Martin Molter, Aidlingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/514,851

(22) Filed: Feb. 28, 2000

(30) Foreign Application Priority Data

Feb. 26, 1999 (DE) .......................................... 199 08 497

(51) Int. Cl.⁷ ................................................ B60H 1/28
(52) U.S. Cl. ...................... 296/208; 296/186; 454/159; 454/141; 165/41; 237/12.3 R
(58) Field of Search ................................ 296/186, 208, 296/37.8, 180.1; 237/12.3 R, 12.3 A; 454/141, 142, 144, 159, 160, 161; 165/41, 42, 43

(56) References Cited

U.S. PATENT DOCUMENTS

| | | | |
|---|---|---|---|
| 1,177,022 A | * 3/1916 | Crist | |
| 1,733,759 A | * 10/1929 | Snell | |
| 2,523,923 A | * 9/1950 | Rodert | |
| 2,703,680 A | * 3/1955 | Nallinger | |
| 2,727,692 A | * 12/1955 | Stump | |
| 4,884,744 A | * 12/1989 | Padgaonkar | 237/12.3 R |
| 5,137,326 A | * 8/1992 | George | 296/208 |
| 5,443,208 A | * 8/1995 | Potter | 237/12.3 A |
| 5,738,404 A | * 4/1998 | Stadler et al. | 296/180.1 |
| 5,803,530 A | * 9/1998 | Shrzypek et al. | 296/180.1 |
| 5,839,774 A | * 11/1998 | Hack et al. | 296/91 |
| 5,915,619 A | * 6/1999 | Etheve | 237/12.3 A |
| 6,152,522 A | * 11/2000 | Boulay et al. | 296/208 |

FOREIGN PATENT DOCUMENTS

| | | |
|---|---|---|
| DE | 568 608 | 1/1933 |
| DE | 850 998 | 9/1952 |
| DE | 931 565 | 8/1955 |
| DE | 92 01 474 | 5/1992 |
| DE | 196 54 370 | 2/1996 |
| DE | 196 45 550 | 5/1996 |
| DE | 197 00 739 | 1/1997 |
| DE | 197 11 379 | 3/1997 |

* cited by examiner

Primary Examiner—Joseph D. Pape
(74) Attorney, Agent, or Firm—Crowell & Moring LLP

(57) ABSTRACT

The invention relates to an open motor vehicle such as a convertible, roadster or the like, which has a vehicle body, a drive device with internal combustion engine, gearbox and exhaust system, a vehicle interior with at least one vehicle seat with backrest and headrest and a fresh-air/heating device. In order to increase the air-conditioning comfort when driving with the top down and in order to improve the sense of well-being of the vehicle occupants, the fresh-air/heating device has at least one air vent which is provided in the vehicle interior behind the at least one vehicle seat, and at least one air duct which is connected to the air vent and to which air which has been heated by the waste heat of the drive device can be fed.

28 Claims, 4 Drawing Sheets

HEATING SYSTEM FOR AN OPEN MOTOR VEHICLE

This application claims the priority of German Patent Application 199 08 497.1, filed Feb. 26, 1999, the disclosure of which is expressly incorporated by reference herein.

The invention relates to an open motor vehicle such as a convertible, roadster or the like with an air vent opening to a seat headrest area for supplying fresh heated air.

In a known motor vehicle of this type (German Patent Document DE 197 00 739 C1), the fresh-air/heating device is of flat design and is integrated into a windbreak which is arranged behind the backrests of the vehicle seats and covers the headrest region. The heating device heats the cold air which flows through the windbreak owing to the reversal of the relative wind and reduces in this way troublesome air draft phenomena when driving without a top and thus also makes it possible to drive with the top down at low external temperatures. The heating device is arranged in the form of an electric heating wire mesh within the windbreak frame or is adjoined parallel to the windbreak as an inherently rigid structure and is connected to said windbreak by means of attachment elements. As an alternative, the heating device can also take the form of a plate or disc heat transferring device, in which case it can be operated with liquid or gaseous heat transfer media in a heat transfer circuit.

When the fresh air/heating device is embodied in such a way, shoulders, neck and throat of the vehicle occupant which are particularly sensitive can be pleasantly airconditioned. However, a draft of cold air flows into the rear part of the vehicle via the opening which exists between the windbreak and the rear wall of the vehicle interior in some motor vehicles, and gives rise to considerable draft phenomena in the region of the legs. The heating device is also relatively complex.

In another known motor vehicle (German Patent Document DE 92 01 474 U1), in order to reduce the air draft phenomena which are troublesome to the vehicle occupants, air streams which emerge from an air vent which is arranged in the headrest region of the vehicle seats and directed obliquely upwards and to the rear are fed in a targeted fashion to the shoulder and neck region of the vehicle occupants when driving with the top down. In order to generate these air streams, air is collected from inlet openings provided on the vehicle and fed to the air vent by means of ram pressure and/or a blower.

In a motor vehicle with an internal combustion engine it is known to heat the vehicle interior by means of air heated by the exhaust gases (German Patent Document DE PS 850 998), the heat-transferring components which are arranged in a safety space which is positioned between a fresh air heater which is fed with fresh air and the exhaust line are designed, for the purpose of improving the heating performance, as metallic intermediate elements which connect the wall of the exhaust line to the inner wall of the fresh air heater. The inner wall of the fresh air heater is provided with indirect heating faces which extend into the fresh air heater.

The invention is based on an object of improving the air conditioning when driving with the top down in an open motor vehicle of the type mentioned at the beginning, and of thus improving the sense of well-being of the vehicle occupants.

The object is achieved in an open motor vehicle of the type mentioned at the beginning in accordance with the invention by providing an arrangement of the above described type, wherein the at least one air vent is arranged underneath the sill line of the vehicle body and is arranged on or in the rear wall of the vehicle interior.

The motor vehicle according to the invention has the advantage that the waste heat of the drive device, in particular for example of the internal combustion engine and/or of the gearbox and/or of the exhaust system, is used to heat the air, and the air which is heated in this way is mixed with the cold air flowing into the rear region of the vehicle, and as a result no unpleasant cold air streams can be felt anymore either there or in the footwell of the rear part of the passenger compartment. As a result of the fact that the warm air leaving the air vent flows out in the direction of the upper side of the backrest or the lower region of the headrest, warm air is applied directly and more intensively to the shoulder and neck region of the vehicle occupants, which improves the sense of well-being of the vehicle occupants while driving with the top down. The fresh-air/heating device is, in contrast with the known motor vehicle, part of the vehicle itself, for example part of the vehicle body, and is not arranged specifically in the windbreak. As a result, the design of the windbreak does not have to fulfil structural requirements which arise from technical considerations. The forced ventilation of the air duct can either be effected by means of ram pressure which occurs during driving or by means of a gearbox. The utilization of the waste heat of the drive device with internal combustion engine, gearbox and exhaust system which remains unused in conventional vehicles is exploited in the invention to heat the air, and dispenses with the need for additional energy sources for heating, when required.

Advantageous embodiments of the motor vehicle according to the invention with expedient refinements are described herein and in the claims.

In one advantageous embodiment of the invention, the at least one air vent is arranged under the sill line of the vehicle body on or in the rear wall of the vehicle interior, in which case it can preferably extend over the entire width of the vehicle interior. In conjunction with a windbreak which is assigned to the vehicle seats and which is arranged behind the backrest so as to cover at least the headrest region and is positioned in front of the air vent, a significantly improved level of airconditioning comfort is obtained when driving with the top down.

Other objects, advantages and novel features of the present invention will become apparent from the following detailed description of the invention when considered in conjunction with the accompanying drawings.

DETAILED DESCRIPTION OF THE DRAWINGS

Figure 1:
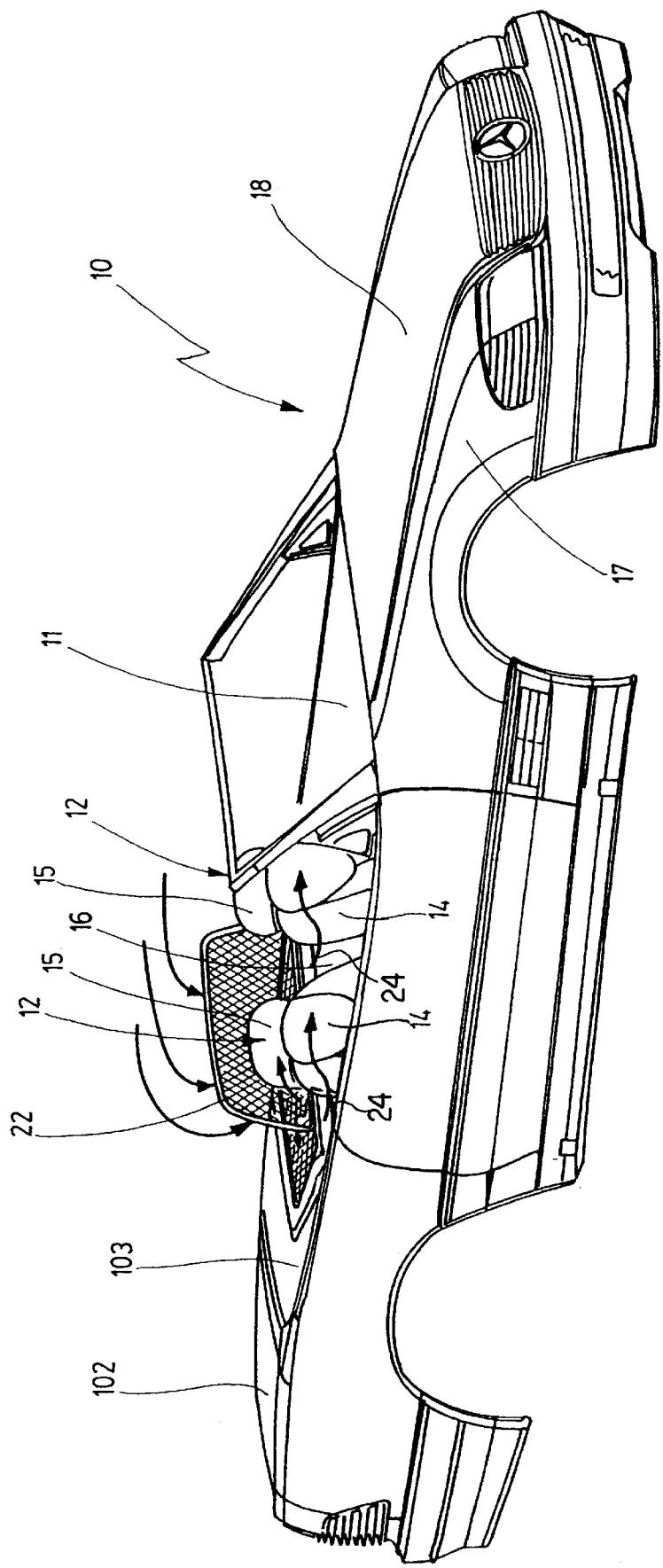
FIG. 1 shows a schematic perspective view of a vehicle body of a convertible with the top down and with the windbreak erected, constructed according to preferred embodiments of the present invention.
Figure 2:
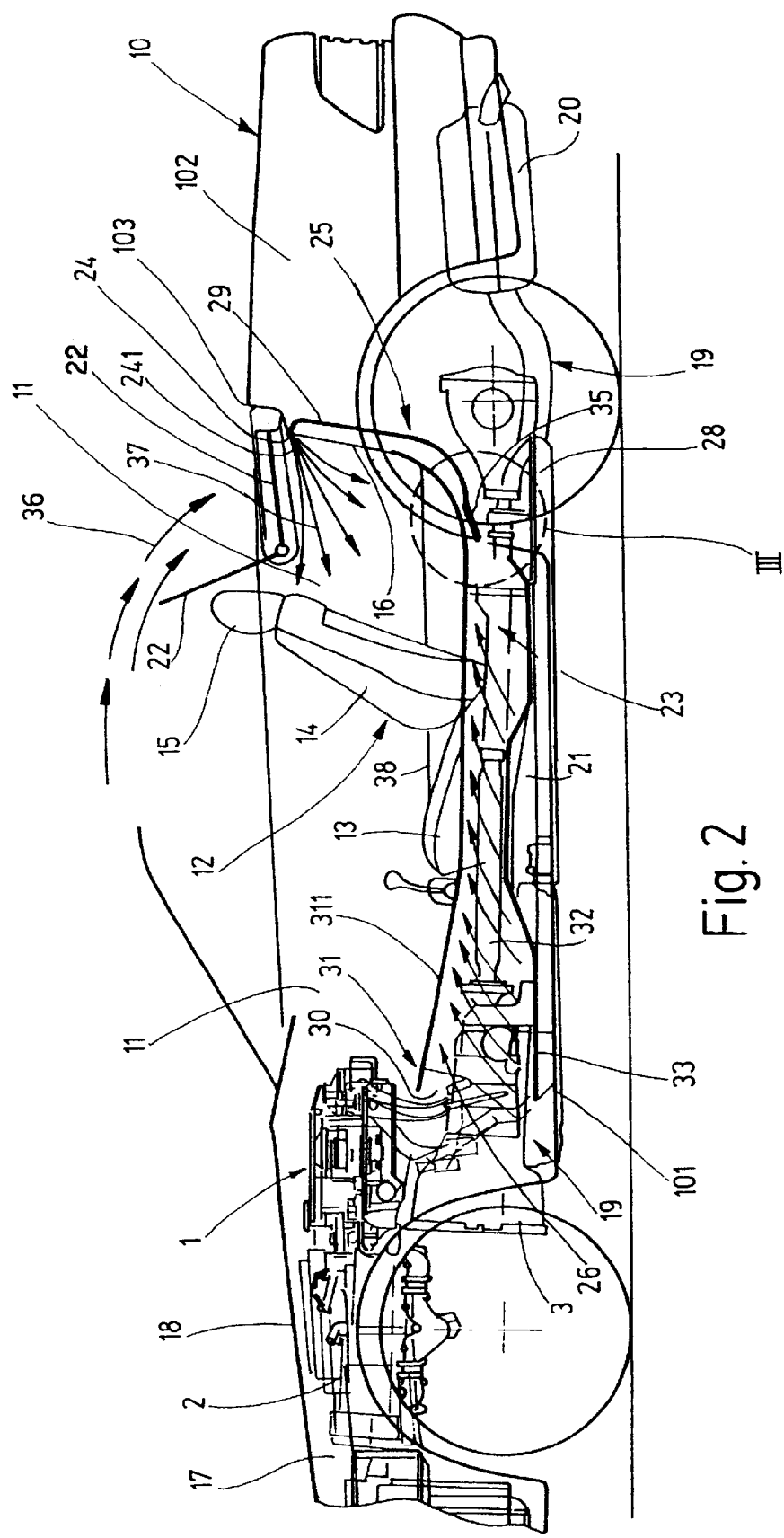
FIG. 2 shows a schematic, partially sectional side view of the convertible in FIG. 1.

FIG. 1 shows the vehicle body 10, in a perspective view, and FIG. 2 shows a detail of a vehicle interior 11 with rear 102 in a side view, both of a convertible as an exemplary embodiment of a generally known, open motor vehicle, i.e.

of a motor vehicle with a top which can be pivoted away or removed. In this exemplary embodiment, two vehicle seats 12 are arranged one next to the other in the vehicle interior 11, one of which vehicle seats 12 represents a driver's seat and the other a front seat passenger's seat. Each vehicle seat 12 is, as is customary, equipped with seat cushions 13, a backrest 14 and headrest 15. The vehicle interior 11 is bounded at the rear by a rear wall 16 and at the front by a front wall (not illustrated in more detail). An engine compartment 17, which is covered at the top by an engine hood 18, is usually arranged in front of the vehicle interior 11. The motor vehicle has a drive device 1 with internal combustion engine 2 in the engine compartment 17, with gearbox 3, from which an articulated shaft 32 leads to the rear, and with an exhaust system 19 which leads from the internal combustion engine 2 underneath the floor 101 of the vehicle body to the rear of the vehicle, and has, for example, an exhaust Silencer 20 and a booster part 28 and a catalytic converter 21 to reduce the emission of pollutants.

In another exemplary embodiment which is not shown, the air guiding device 26 is provided with its own wall components which are arranged inside the floor tunnel 31. As is clear in particular from FIG. 2, the air guiding device 26 has an air inlet 30 which widens towards the front in the direction of travel approximately in the shape of a funnel and which is connected to the surroundings of the vehicle and which is formed by wall components 311 of the floor tunnel 31 or, in another exemplary embodiment which is not shown, is formed instead by separate wall components which are constituent parts of an air guiding device 26 which is arranged in the floor tunnel 31. By means of this air guiding device 26, which in the exemplary embodiment shown is present in any case in the vehicle in the form of the floor tunnel 31 with its wall components 311, heat is extracted from the drive device 1, in particular from the internal combustion engine 2 and/or from the gearbox 3 and/or from the exhaust system 19, in particular in the form of radiant heat during driving and is used to heat that air which passes through the air guiding device 26 and is conducted from the latter into the air duct 25.

The fresh-air/heating device 23 has at least one air vent 24 which is provided in the vehicle interior 11 behind the at least one vehicle seat 12, and at least one air duct 25 which is connected to the air vent 24 and to which it is possible to feed air which, during operation, is heated by the waste heat of the drive device 1, in particular of the internal combustion engine 2 and/or of the gearbox 3 and/or of the exhaust system 19. The at least one air vent 24 is arranged here in particular behind the backrests 14 of the vehicle seats 12, and the air vent 24 can extend over the width of the backrests 14 of the vehicle seats 12.

The air vent 24 is composed, in the example shown, of an approximately horizontally extending duct which contains a plurality of air vent openings 241 which are arranged distributed over the width of the backrest 14. Such an air vent 24 with horizontally extending duct can extend, for example, approximately over the entire width of the vehicle interior 11. The at least one air vent opening 241 is arranged approximately flush with the rear wall 16 (FIG. 2) and arranged and designed in such a way that the direction in which the air emerging from the at least one air vent opening 241 flows out is directed towards the upper edge of the backrests 14. The air vent 24 is arranged underneath the sill line 103 on or in the rear wall 16. The at least one air vent 24 forms in this way the upper end of the air duct 25 which can be arranged on or in the rear wall 16.

The air duct 25 starts from the air vent 24 and leads downwards approximately as far as a floor tunnel 31 (indicated only schematically) which is formed in the customary way by means of lateral, upwardly extending wall components 311 and an upper wall component 311 which is connected thereto. The air duct 25 is connected to an air guiding device 26 which is open at least towards the front in the direction of travel and from which heated air is expelled. This air guiding device 26 can be formed in a particularly easy way according to the exemplary embodiment illustrated by means of the wall components 311 of the floor tunnel 31 itself.

In another exemplary embodiment which is not shown, the air guiding device 26 is provided with its own all components which are arranged inside the floor tunnel 31. As is clear in particular from FIG. 2, the air guiding device 26 has an air inlet 30 which widens towards the front in the direction of travel approximately in the shape of a funnel and which is connected to the surroundings of the vehicle and which is formed by wall components 311 of the floor tunnel 31 or, in another exemplary embodiment which is not shown, is formed instead by separate wall components which are constituent parts of an air guiding device 26 which is arranged in the floor tunnel 31. By means of this air guiding device 26, which in the exemplary embodiment shown is present in any case in the vehicle in the form of the floor tunnel 31 with its wall components 211, heat is extracted from the drive device 1, in particular from the internal combustion engine 2 and/or from the gearbox 3 and/or from the exhaust system 19, in particular in the form of radiant heat during driving and is used to heat that air which passes through the air guiding device 26 and is conducted from the latter into the air duct 25.

The air duct 25 is connected to the air guiding device 26 according to FIG. 2 in a region located behind the catalytic converter 21, with the result that the radiant heat of the catalytic converter 21 is additionally used to heat that air which passes through the air guiding device 26 and is conducted from it into the air duct 25.

In another exemplary embodiment which is not shown, the air duct 25 can also be connected to the air guiding device 26 in another region, for example in a region which is located behind the drive device 1, in particular behind the gearbox 3. The air duct 25 is charged with air, for example by ram pressure or forcibly by means of a blower 39 which is indicated schematically in FIGS. 3 and 4, said air being channelled and directed by the air guiding device 26.

In the exemplary embodiment shown, the radiant heat of the catalytic converter 21 is also utilized. As is clear from FIG. 3 and also from FIG. 4, an articulated shaft 32 runs within the floor tunnel 31. Arranged above parts of the exhaust system 19, for example of the catalytic converter 21, is a screen plate 33 which is a good conductor of heat, heated air being able to flow into the region above the screen plate 33 and in the interior of the floor tunnel 31.

Figure 3:
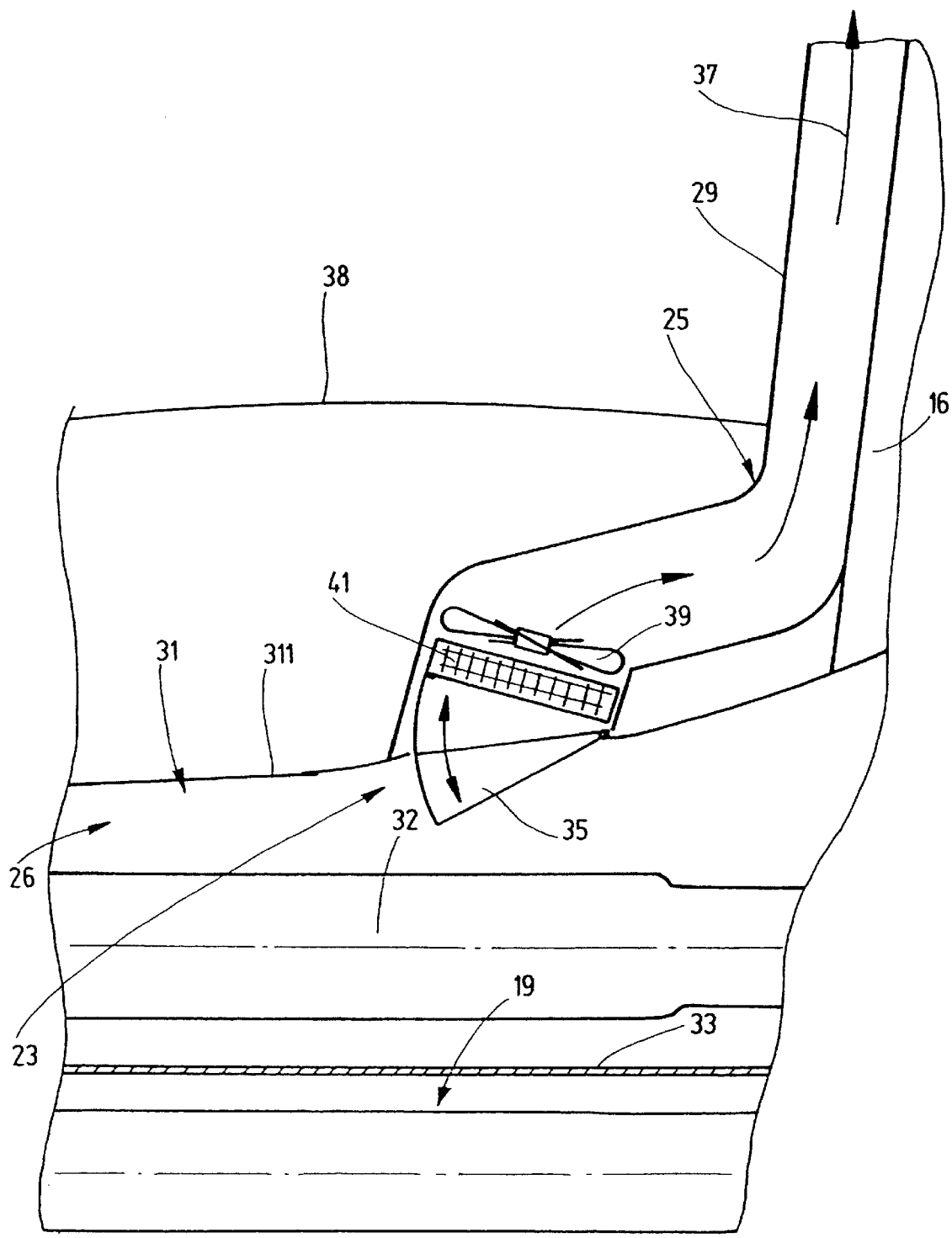
FIG. 3 shows a schematic, partially sectional side view of a detail III in FIG. 2 on an enlarged scale.
Figure 4:
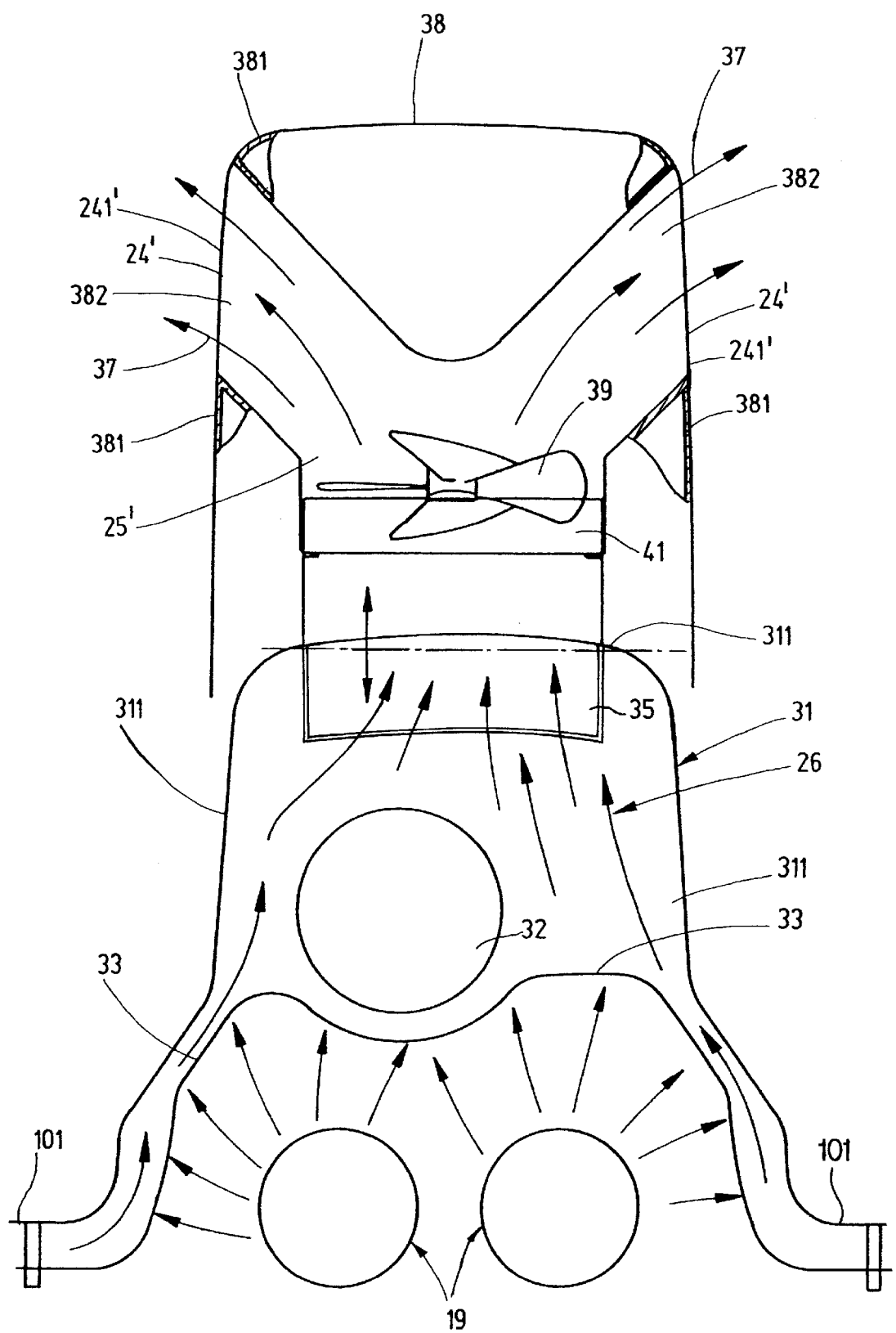
FIG. 4 shows a schematic, vertical section through parts of the motor vehicle in the vicinity behind the vehicle seats according to a modified exemplary embodiment.

In particular FIGS. 3 and 4 show at least one blower 39 by means of which the heated air is fed with forced flow in the air duct 25. The air duct 25 contains a filter 41, in particular an activated carbon filter. The latter is located in front of the blower 39, viewed in the direction of flow of the heated air. The blower 39 has a fan wheel which is arranged in the air duct 25 at the air inlet of said air duct 25. In another exemplary embodiment which is not shown, the blower 39 is located further inside the air duct 25, viewed in the direction of flow of the heated air.

The air guiding device 26 and/or the air duct 25 has a flap 35 for controlling the air flow. In the exemplary embodiment shown, the flap 35 is in the vicinity of the air inlet of the air duct 25. It is designed to close off or clear the air duct 25 as desired. The flap 35 has approximately the shape of a blade and can be pivoted, according to FIG. 3, about an, for example, approximately horizontal axis from a closed position which essentially closes off the air duct inlet into an open position which opens said air duct inlet and in which the flap 35 protrudes approximately in the manner of a blade into the air guiding region of the air guiding device 26 so as to extract air from it. The flap 35 is positively controlled as a function of external parameters, for example summer/winter conditions, status of the top (open or closed), driving condition (stop/go) or the like. For this purpose, an actuator drive (not shown in more detail) which is connected to a control device (not shown in more detail) for this positive control engages on the flap 35.

If the flap 35 is in the open position shown in FIG. 3, air is heated by the waste heat of the drive device 1 when the vehicle is driving, is extracted by means of the flap 35 from the vicinity of the air guiding device 26 located there and is directed into the air duct 25 and forcibly fed, by means of the blower 39, through the air duct 25 as far as the at least one air vent 24. The heated air emerges here into the vehicle interior 11 with direction of flow directed towards the headrests 15, and heats the particularly sensitive head region, shoulder region and neck region of the vehicle occupants here. The cold air which flows in via the windbreak 22 and around the windbreak 22 behind the backrests 14 of the vehicle seats 12 and into the vehicle interior 11, said cold air being symbolized in FIG. 2 by arrows 36, has added to it, in the vicinity of the air vent 24, the warm air which is flowing out there, symbolized by arrows 37, with the result that only airconditioned air and not cold air now passes into the floor region of the vehicle interior 11, and in this way troublesome draft phenomena can be avoided in the back and leg regions.

In addition, or alternatively, an improvement in airconditioning comfort can also be achieved by providing outlet openings 382 to form air outlet openings 241' in the walls 381 of the center console 38 in a modified embodiment according to FIG. 4, said air outlet openings 241' enabling warm air flows to flow into the floor region of the vehicle interior 11. With this particular design, at least one air outlet opening 241' of the air duct 25' is arranged in the region of the vehicle near to the floor in order to heat the rear part of the passenger compartment at the back of the at least one vehicle seat 12. The air duct 25' which is formed, for example, from an air guiding pipe 29 on or in the rear wall 16 in the exemplary embodiment in FIGS. 1 to 3, is formed directly by the walls 381 of the center console 38 in the exemplary embodiment in FIG. 4, the at least one air vent opening 241 being formed by at least one opening 382, in particular in the laterally extending walls 381 of this center console 38. In another exemplary embodiment which is not shown, the air duct 25' is alternatively provided with its own wall components and contained with them within the center console 38. In the exemplary embodiment in FIG. 4, as in the preceding exemplary embodiment, when the flap 35 is in the open position shown, heated air which has been channelled by the air guiding device 26, that is to say through the floor tunnel 31 here, is extracted, using the flap 35 into the inner region of the center console 38 located above the latter, which region is to be considered as air duct 25', and, when the fan 39 is switched on, it is forcibly guided into the region of the vehicle which is near to the floor by air vent openings 241' of lateral air vents 24' on both sides, in which region this heated air can cause the floor region of the vehicle interior 11 to be heated up. The design according to FIG. 4 can be provided as an alternative to the design according to FIGS. 1–3 or else in addition to it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Open motor vehicle comprising:
   a vehicle body,
   a drive device with an internal combustion engine, a gearbox and an exhaust system,
   a vehicle interior with at least one vehicle seat with a backrest and a headrest and a space which is located at the rear of the at least one vehicle seat between the at least one vehicle seat and a rear wall extending behind it at a distance, said space being covered by a net-like covering at a level of a sill line of the vehicle body, and
   an air vent which is extends behind the at least one vehicle seat, said air vent having at least one air vent opening, and being connected to an air duct which is connected to an air guiding device which is connected to the vehicle and can be fed with air flowing in the vehicle,
   wherein the air vent is arranged underneath a sill line of the vehicle body on or in the rear wall of the vehicle interior.

2. Motor vehicle according to claim 1,
   wherein the air duct is fed with air which has been heated by heat of the vehicle drive device.

3. Motor vehicle according to claim 2,
   wherein the air heated by said drive device is supplied by at least one of said internal combustion engine, said gearbox and said exhaust system.

4. Motor vehicle according to claim 3,
   wherein the air heated by said drive device is supplied by at least two of said internal combustion engine, said gearbox, and said exhaust system.

5. Motor vehicle according to claim 3,
   wherein the air heated by said drive device is supplied by said internal combustion engine, said gearbox, and said exhaust system.

6. Motor vehicle according to claim 1,
   wherein each of said at least one air vent has a plurality of air vent openings which are arranged distributed over the width of the rear wall and have a flow-out opening which is directed essentially towards the backrest region.

7. Motor vehicle according to claim 1,
   wherein the at least one air vent includes one air vent which extends over the entire width of the vehicle interior.

8. Motor vehicle according to claim 1,
   wherein a windbreak is provided for the at least one vehicle seat, said windbreak being arranged behind the backrest so as to protrude above at least the headrest region when erected, and
   wherein the windbreak is positioned in front of the at least one air vent.

9. Motor vehicle according to claim 7,
   wherein a windbreak is provided for the at least one vehicle seat, said windbreak being arranged behind the backrest so as to protrude above at least the headrest region when erected, and wherein the windbreak is positioned in front of the at least one air vent.

10. Motor vehicle according to claim 1, wherein the air guiding device is open towards the front of the vehicle body in the direction of travel and heated air from the drive device is expelled from the air guiding device into the air duct.

11. Motor vehicle according to claim 10, further comprising:

a floor tunnel, wherein the air guiding device is formed by wall components of said floor tunnel.

12. Motor vehicle according to claim 1, wherein the air duct is connected to the air guiding device in a region of the air guiding device which is located behind a gearbox of the drive device.

13. Motor vehicle according to claim 11, wherein the air duct is connected to the air guiding device in a region of the air guiding device which is located behind a gearbox of the drive device.

14. Motor vehicle according to claim 2, wherein the air duct is connected to the air guiding device in a region of the air guiding device which is located behind at least one catalytic converter of an exhaust system, said air duct being connected to said air guiding device in such a way that the radiant heat of the catalytic converter is additionally used to heat that air which passes through the air guiding device and is conducted from the latter into the air duct.

15. Motor vehicle according to claim 10, wherein the air guiding device has an air inlet which widens in the front of the vehicle body in the direction of travel approximately in the shape of a funnel, is connected to the surroundings of the vehicle and is formed by wall components of the floor tunnel or by air guiding device structure which is arranged in the floor tunnel.

16. Motor vehicle according to claim 14, wherein the air guiding device has an air inlet which widens in the front of the vehicle body in the direction of travel approximately in the shape of a funnel, is connected to the surroundings of the vehicle and is formed by wall components of the floor tunnel or by air guiding device structure which is arranged in the floor tunnel.

17. Motor vehicle according to claim 1, wherein the air duct contains an activated carbon filter.

18. Motor vehicle according to claim 10, wherein the air duct contains an activated carbon filter.

19. Motor vehicle according to claim 13, wherein the air duct contains an activated carbon filter.

20. Motor vehicle according to claim 14, wherein the air duct contains an activated carbon filter.

21. Motor vehicle according to claim 1, wherein at least one air vent opening of the air duct is arranged in a region of the vehicle interior which is near to the floor in order to heat the rear region of the passenger compartment at the rear of the at least one vehicle seat.

22. Motor vehicle according to claim 6, wherein at least one air vent opening of the air duct is arranged in a region of the vehicle interior which is near to the floor in order to heat the rear region of the passenger compartment at the rear of the at least one vehicle seat.

23. Motor vehicle according to claim 8, wherein at least one air vent opening of the air duct is arranged in a region of the vehicle interior which is near to the floor in order to heat the rear region of the passenger compartment at the rear of the at least one vehicle seat.

24. Motor vehicle according to claim 21, wherein the air duct is formed in a part of a center console, and wherein the at least one air vent opening is formed by at least one outlet opening in lateral walls of the center console.

25. Motor vehicle according to claim 20, wherein the air duct is formed in part by walls of a vehicle center console, and wherein at least one of the at least one air vent openings is formed by an outlet opening in lateral walls of the center console.

26. An motor vehicle according to claim 1, wherein the open motor vehicle is a convertible or a roadster.

27. A motor vehicle according to claim 1, wherein the at least one air vent extends on the rear wall a distance at least the width of the backrest of the at least one vehicle seat.

28. Motor vehicle according to claim 10, further comprising:

a floor tunnel, wherein the air guiding device is arranged inside the floor tunnel.

* * * * *